United States Patent
Ueki et al.

(10) Patent No.: US 9,249,857 B2
(45) Date of Patent: *Feb. 2, 2016

(54) ANTI-VIBRATION APPARATUS

(75) Inventors: Akira Ueki, Kamakura (JP); Yasuyuki Nagashima, Yokohama (JP); Yoshinori Matsumoto, Yokohama (JP); Takahiro Saito, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 535 days.

This patent is subject to a terminal disclaimer.

(21) Appl. No.: 12/746,885

(22) PCT Filed: Dec. 12, 2008

(86) PCT No.: PCT/JP2008/072701
§ 371 (c)(1),
(2), (4) Date: Jun. 8, 2010

(87) PCT Pub. No.: WO2009/075362
PCT Pub. Date: Jun. 18, 2009

(65) Prior Publication Data
US 2010/0270716 A1    Oct. 28, 2010

(30) Foreign Application Priority Data

Dec. 12, 2007  (JP) ................................ 2007-320617
Jun. 17, 2008  (JP) ................................ 2008-158350

(51) Int. Cl.
*F16F 5/00*     (2006.01)
*F16F 13/10*    (2006.01)

(52) U.S. Cl.
CPC ............. *F16F 13/10* (2013.01); *F16F 2224/04* (2013.01)

(58) Field of Classification Search
CPC .......... F16F 13/10; F16F 15/023; F16F 15/16
USPC ........ 267/140.11–140.15; 248/560, 562, 566; 252/67
See application file for complete search history.

(56) References Cited

U.S. PATENT DOCUMENTS

| | | | | |
|---|---|---|---|---|
| 4,342,884 | A | * | 8/1982 | Ban et al. ........................ 200/34 |
| 4,826,126 | A | * | 5/1989 | Katayama et al. ............. 248/562 |
| 5,143,358 | A | * | 9/1992 | Hibi et al. ................ 267/140.13 |
| 5,180,148 | A | * | 1/1993 | Muramatsu ............. 267/140.14 |

(Continued)

FOREIGN PATENT DOCUMENTS

| | | |
|---|---|---|
| CN | 1697943 A | 11/2005 |
| CN | 1701189 A | 11/2005 |

(Continued)

OTHER PUBLICATIONS

Machine translation of JP 07-054903.*
Power Chemical, "Silicone Oil", Jan. 2006, p. 3.*
MEGlobal, "Ethylene Glycol Product Guide", 2008, p. 7.*

(Continued)

*Primary Examiner* — Robert A Siconolfi
*Assistant Examiner* — Mahbubur Rashid
(74) *Attorney, Agent, or Firm* — Sughrue Mion, PLLC

(57) ABSTRACT

A liquid (L) sealed in a first mounting member (11) of an anti-vibration apparatus (10) contains a first liquid and a second liquid that are mutually insoluble, the second liquid having a higher vapor pressure and a lower weight percentage (weight %) included in the liquid than those of the first liquid. In the anti-vibration apparatus, the size of a generated abnormal noise can be reduced without complicating the structure and deteriorating a damping performance.

8 Claims, 5 Drawing Sheets

(56) References Cited

U.S. PATENT DOCUMENTS

| | | | |
|---|---|---|---|
| 5,508,334 A * | 4/1996 | Chen | 524/474 |
| 5,628,498 A | 5/1997 | Nanno | |
| 6,032,937 A * | 3/2000 | Kojima et al. | 267/140.14 |
| 6,631,894 B2 * | 10/2003 | Takashima et al. | 267/140.14 |
| 7,070,175 B2 | 7/2006 | Sakata | |
| 7,216,857 B2 | 5/2007 | Yamamoto | |

FOREIGN PATENT DOCUMENTS

| | | |
|---|---|---|
| JP | 57-009340 A | 1/1982 |
| JP | 57-163747 A | 10/1982 |
| JP | 60-205041 A | 10/1985 |
| JP | 02-085537 A | 3/1990 |
| JP | 04-136534 A | 5/1992 |
| JP | 05-033824 | 2/1993 |
| JP | 06-221372 A | 8/1994 |
| JP | 07-054903 A | 2/1995 |
| JP | 08-170683 A | 7/1996 |
| JP | 10-252811 A | 9/1998 |
| JP | 2001012537 A | 1/2001 |
| JP | 2003-148548 A | 5/2003 |
| JP | 2006-144817 A | 6/2006 |

OTHER PUBLICATIONS

Fisher Scientific, "Dow Corporation DC 200 Silicone Fluid Material Safety Data Sheet", Aug. 1993, p. 1.*
International Search Report for International Application No. PCT/JP2008/072701 dated Jan. 13, 2009.
Extended European Search Report dated Jan. 17, 2013 in European Patent Application No. 08859892.5.
Chinese Office Action dated Mar. 13, 2013 issued in Chinese Patent Application No. 200880119982.9.
International Search Report for PCT/JP2009/061012 dated Sep. 8, 2009.
Chinese Office Action issued in Application No. 200980123126.5 dated Jul. 11, 2012.
PTO/SB/08a filed on Dec. 17, 2010 for U.S. Appl. No. 12/999,827.
PTO/SB/08a filed on Oct. 2, 2012 for U.S. Appl. No. 12/999,827.
Silicone Products for Personal Care KF-611, KF-611P, or KF-6043, produced by Shin-Etsu Silicone, May 2011.
Final Office Action dated Dec. 17, 2012 issued in U.S. Appl. No. 12/999,827.
Non-Final Office Action dated Apr. 4, 2013 issued in U.S. Appl. No. 12/999,827.
Notice of Allowance dated Oct. 29, 2013 issued in U.S. Appl. No. 12/999,827.

* cited by examiner

US 9,249,857 B2

ANTI-VIBRATION APPARATUS

TECHNICAL FIELD

The present invention relates to an anti-vibration apparatus that is applied to a vehicle, an industrial machine or the like to absorb and dampen the vibration of a vibration generating portion such as an engine.

The present invention claims priority from Japanese Patent Application Nos. 2007-320617 filed on Dec. 12, 2007 and 2008-158350 filed on Jun. 17, 2008, which are hereby incorporated by reference herein.

BACKGROUND ART

As this type of anti-vibration apparatus, hitherto, an anti-vibration apparatus having the following structure has been known. The apparatus includes a cylindrical first mounting member connected to one of a vibration generating portion and a generation receiving portion, a second mounting member connected to the other of the vibration generating portion and the vibration receiving portion, and a first rubber elastic body for elastically connecting the first and second mounting members to each other. Furthermore, an inner part of the first mounting member is divided into a primary liquid chamber and a secondary liquid chamber by a dividing member. The primary liquid chamber is configured such that a liquid is sealed therein making the first rubber elastic body part of the partition wall and an inner volume thereof is changed due to the deformation of the first rubber elastic body. The secondary liquid chamber is configured such that at least one part of the partition wall is formed in a deformable manner and the liquid is sealed therein. In addition, between an outer peripheral surface side of the dividing member and an inner peripheral surface side of the first mounting member, an orifice passage for linking the primary liquid chamber with the secondary liquid chamber is formed and the liquid is sealed in the primary liquid chamber and the secondary liquid chamber.

In the anti-vibration apparatus, hitherto, after a large vibration (load) has been input due to undulations of a road surface or the like and a liquid pressure of the primary liquid chamber has risen rapidly, for example, when the vibration is input in a reverse direction due to a rebound of the first rubber elastic body or the like, the primary liquid chamber may become a negative pressure. At this time, cavitation is generated in which a plurality of bubbles is produced in the liquid within the primary liquid chamber. Then, when the bubbles dissipate from the liquid along with an increase in the liquid pressure within the primary liquid chamber, a shock wave is generated. The shock wave is diffused to a metallic material such as the first mounting member or the like, which generates an abnormal noise.

As a means for preventing the occurrence of the abnormal noise, as described in Patent Document 1 described below, for example, there is a known structure in which a linking hole for linking the primary liquid chamber with the secondary liquid chamber is formed in the dividing member separately from the orifice passage and a valve is provided in the linking hole. In the apparatus having this structure, after the liquid pressure of the primary liquid chamber has risen rapidly, when a negative liquid pressure would be generated, due to the opening of the valve and the short-circuiting of the primary liquid chamber and the secondary liquid chamber, a decline in the liquid pressure of the primary liquid chamber is suppressed and the occurrence of the cavitation is prevented in advance.

[Patent Citation 1] JP-A 2003-148548

DISCLOSURE OF INVENTION

Technical Problem

However, since the linking hole and the valve or the like are installed in the anti-vibration apparatus of the related art, the structure thereof is complicated. Furthermore, as described above, there is also a difficulty with tuning to adjust the liquid pressure when the valve is opened, and there is the possibility that the valve may unexpectedly open, thereby reducing a damping performance.

The present invention has been made in view of the above circumstances and an object thereof is to provide an anti-vibration apparatus that can reduce a level of the generated abnormal noise without complicating the structure and deteriorating the damping performance.

Technical Solution

In order to solve the above-mentioned problem and achieve the object, the anti-vibration apparatus has the following structure. That is, the apparatus includes a cylindrical first mounting member connected to one of a vibration generating portion and a vibration receiving portion, a second mounting member connected to the other of the vibration generating portion and the vibration receiving portion, and a first rubber elastic body for elastically connecting the first and second mounting members to each other. An inner part of the first mounting member is divided into a primary liquid chamber and a secondary liquid chamber by a dividing member. The primary liquid chamber is configured such that the inner volume thereof is changed due to the deformation of the first rubber elastic body by making the first rubber elastic body part of a partition. The secondary liquid chamber is configured such that at least one part of the partition is formed in a deformable manner and the liquid is sealed therein. In addition, between an outer peripheral surface side of the dividing member and an inner peripheral surface side of the first mounting member, an orifice passage for linking the primary liquid chamber with the secondary liquid chamber is formed and the liquid is sealed in the primary liquid chamber and the secondary liquid chamber. The liquid contains a first liquid and a second liquid that are mutually insoluble, the second liquid having a vapor pressure higher than that of the first liquid and having a weight percentage (weight %) contained in the liquid which is smaller than that of the first liquid.

In the present invention, since the liquid sealed in the primary liquid chamber and the secondary liquid chamber includes the first and second liquids that are mutually insoluble and have different vapor pressures, the vapor pressure of the overall liquid is higher than that of a first liquid alone or that of a second liquid alone.

Thus, after a large vibration (load) has been input due to the undulations of the road surface or the like and the liquid pressure of the primary liquid chamber has risen rapidly, for example, while a vibration in a reverse direction is input due to a rebound of the first rubber elastic body or the like and the liquid pressure within the primary liquid chamber declines, the liquid pressure in which the cavitation begins to occur in an interface region of the first liquid and the second liquid in the liquid increases as compared to a case where the first liquid alone or the second alone is sealed in the primary liquid chamber and the secondary liquid chamber.

Herein, because the second liquid has a higher vapor pressure than that of the first liquid, in the subsequent process of a successive declines in the liquid pressure within the primary liquid chamber, by preferentially generating the cavitation in the second liquid side with higher vapor pressure among the first and second liquids in the interface region, while expanding the bubbles generated by the cavitation, it is possible to suppress the decline in the liquid pressure.

Thus, it is possible to suppress the occurrence of the cavitation in the first liquid, and as the weight percentage of the second liquid is smaller than that of the first liquid in the liquid, the occurrence of the bubbles in the overall liquid can be suppressed.

As a result, in the process when the liquid pressure of the primary liquid chamber rises and is returned to the original liquid pressure, the occurrence of the shock wave due to the collapse of the bubbles can be suppressed, which makes it possible to reduce the level of the generated abnormal noise.

Furthermore, because the weight percentage contained in the liquid of the second liquid, which has a higher vapor pressure than the first liquid and is readily to generate the cavitation, is smaller than that of the first liquid, while the above-mentioned working effect is obtained, even at the normal time when idle vibration and shake vibration are added, it is possible to prevent difficulties in exerting the effect of liquid bridge resonance in the orifice passage due to easy occurrence of the cavitation, with the result that the damping performance of the anti-vibration apparatus can be surely secured.

Meanwhile, if the first liquid and the second liquid mutually dissolve, since the vapor pressure of the overall liquids is equalized according to the amounts of the first and second liquids, the vapor pressure or the like, the cavitation may occur in the overall liquids, and thus the level of the generated abnormal noise cannot be reduced.

Furthermore, for example, since a new mechanism such as a valve mechanism may not be added, complication of the anti-vibration apparatus can be avoided and the level of the generated abnormal noise can be reduced without short-circuiting the primary liquid chamber and the secondary liquid chamber by opening the valve as in the above-mentioned related art. As a result, the working effect is obtained while the decline in the damping performance can be prevented, and thus the damping performance can be stabilized.

Herein, the second liquid may have a smaller latent heat of vaporization than the first liquid.

In this case, since the second liquid has a smaller latent heat of vaporization than the first liquid, it is possible to reduce energy discharged when the bubbles are collapsed in the process when the liquid pressure of the primary liquid chamber rises and is returned to the original liquid pressure, that is, when the phase of the second liquid is changed from a gaseous state to a liquefied state, as compared to energy discharged when the bubbles are generated in the first liquid and are collapsed. Thus, as described above, the occurrence of the bubble in the first liquid is suppressed, and in addition, the energy generated in the overall liquids can be reliably suppressed.

In addition, the first liquid may contain ethylene glycol alone or an ethylene glycol and propylene glycol, and the second liquid may contain silicon oil or fluorine oil.

Furthermore, the liquids may contain the first liquid 60 to 99.9 weight % and may contain the second liquid 0.1 to 40 weight %.

In this case, the above-mentioned working effect is reliably obtained without reducing the damping performance.

Furthermore, although the silicon oil and the fluorine oil are expensive compared to the ethylene glycol and the propylene glycol, the second liquid has a smaller weight percentage in the liquid than the first liquid. Thus, it is possible to suppress an increase in the cost of the anti-vibration apparatus.

Advantageous Effects

According to the present invention, the level of the generated abnormal noise can be reduced without complicating the structure and declining the damping performance.

EXPLANATION OF REFERENCE

10 ANTI-VIBRATION APPARATUS
11 FIRST MOUNTING MEMBER
12 SECOND MOUNTING MEMBER
13 FIRST RUBBER ELASTIC BODY
14 PRIMARY LIQUID CHAMBER
15 SECONDARY LIQUID CHAMBER
16 DIVIDING MEMBER
24 ORIFICE PASSAGE
L LIQUID
O CENTRAL AXIS

BEST MODE FOR CARRYING OUT THE INVENTION

Figure 1:
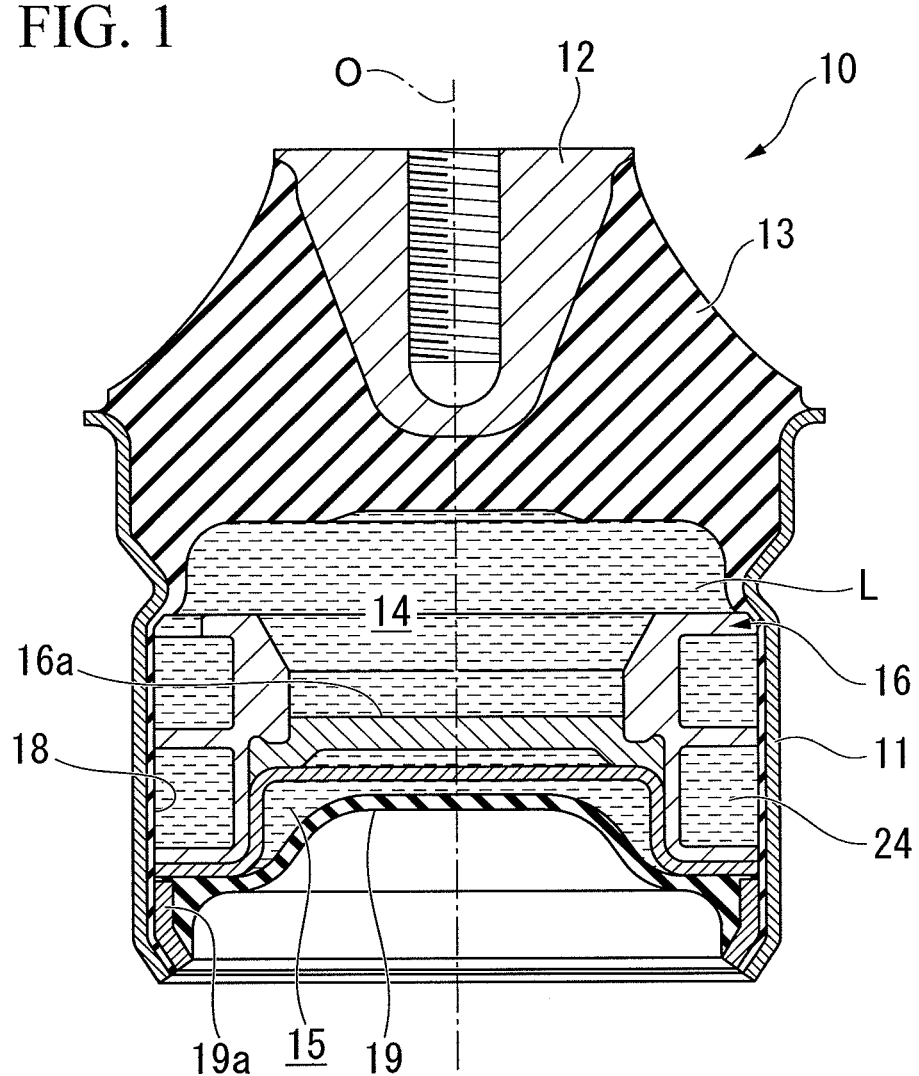
FIG. 1 is a longitudinal sectional view which is shown as an embodiment according to the present invention.
Figure 2:
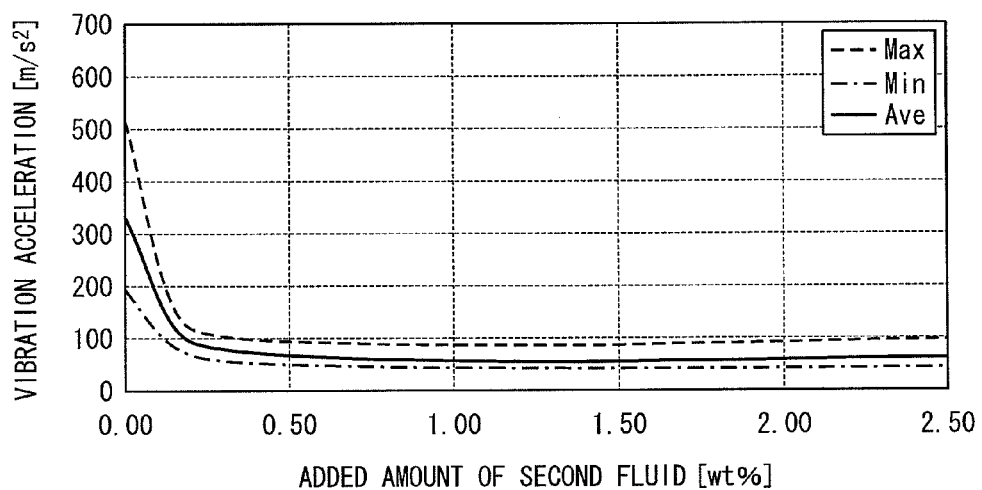
FIG. 2 is a graph showing a relationship of an addition amount of a second liquid to a liquid and vibration acceleration.
Figure 3:
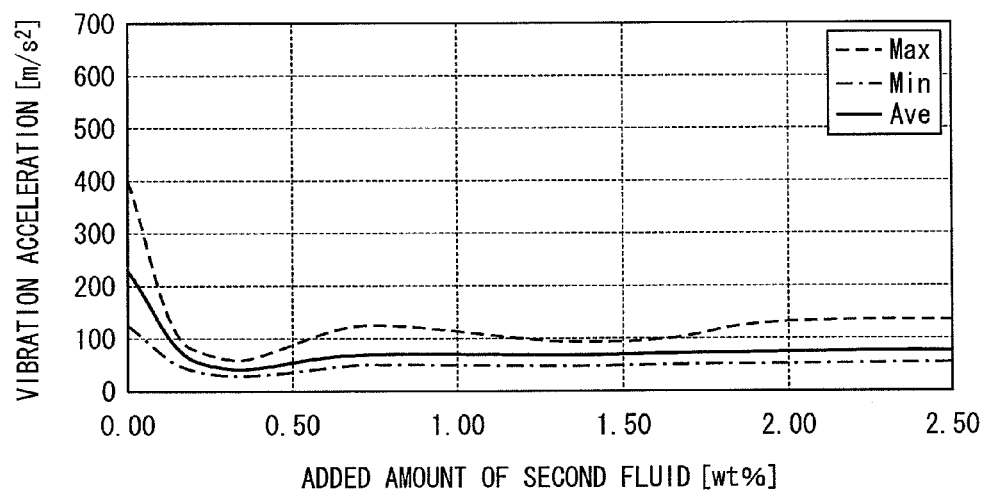
FIG. 3 is a graph showing a relationship of an addition amount of a second liquid to a liquid and vibration acceleration.
Figure 4:
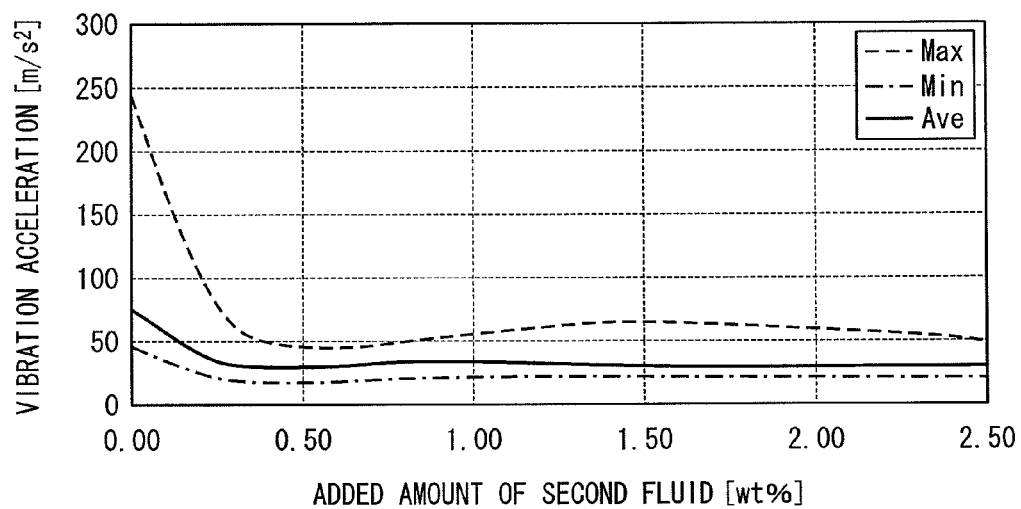
FIG. 4 is a graph showing a relationship of an addition amount of a second liquid to a liquid and vibration acceleration.
Figure 5:
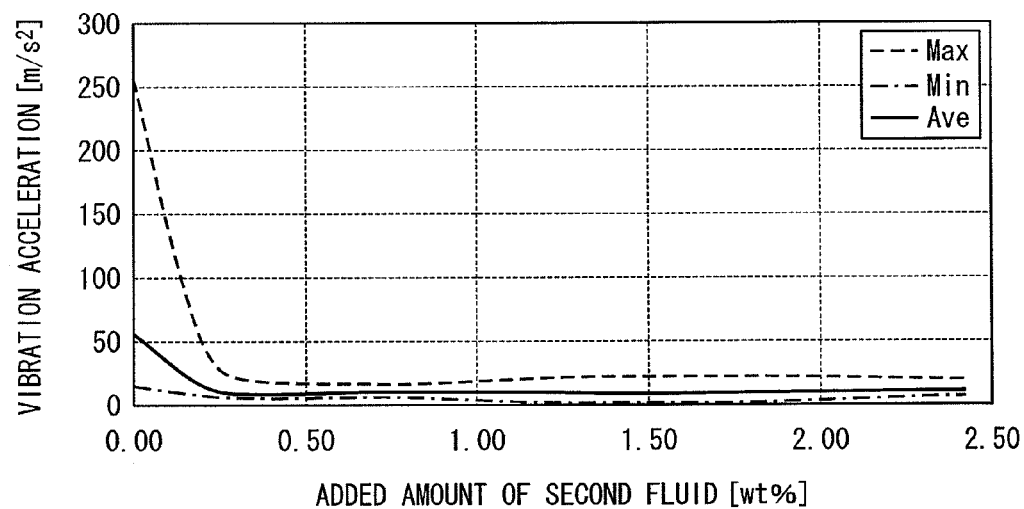
FIG. 5 is a graph showing a relationship of an addition amount of a second liquid to a liquid and vibration acceleration.
Figure 6:
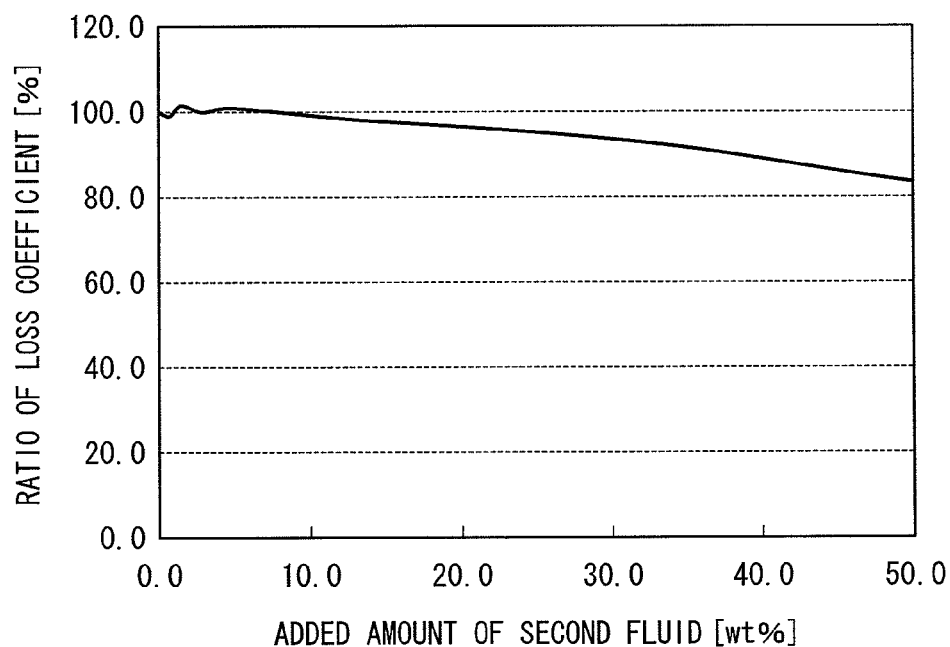
FIG. 6 is a graph showing a relationship of an addition amount of a second liquid to a liquid and a ratio of loss coefficient.
Figure 7:
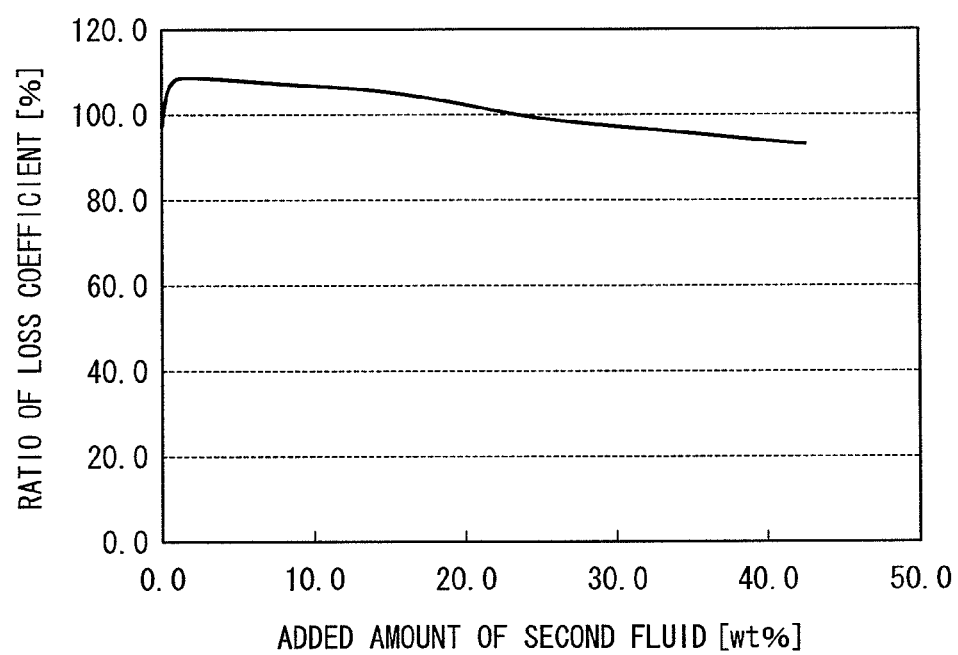
FIG. 7 is a graph showing a relationship of an addition amount of a second liquid to a liquid and a ratio of loss coefficient.
Figure 8:
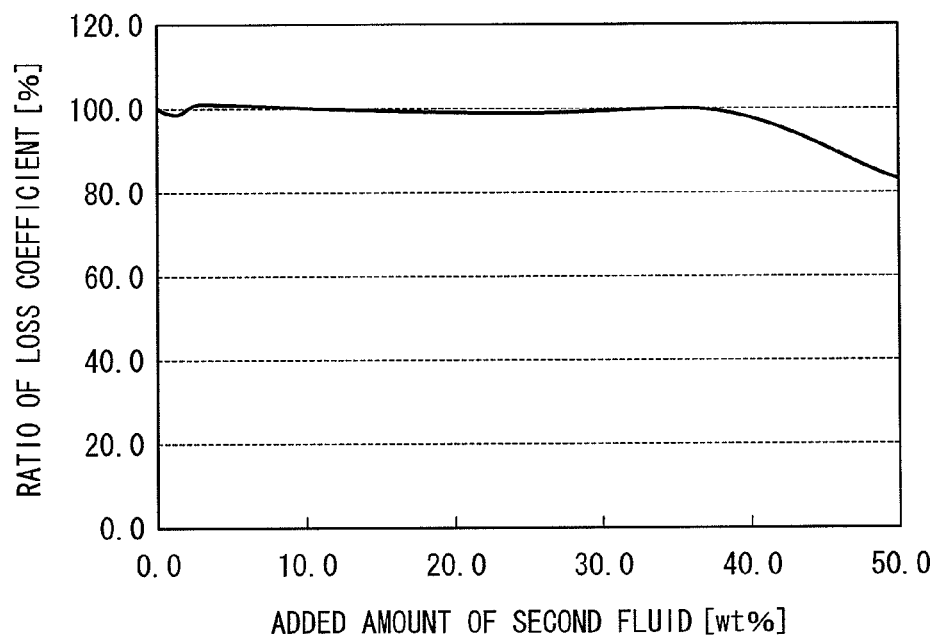
FIG. 8 is a graph showing a relationship of an addition amount of a second liquid to a liquid and a ratio of loss coefficient.
Figure 9:
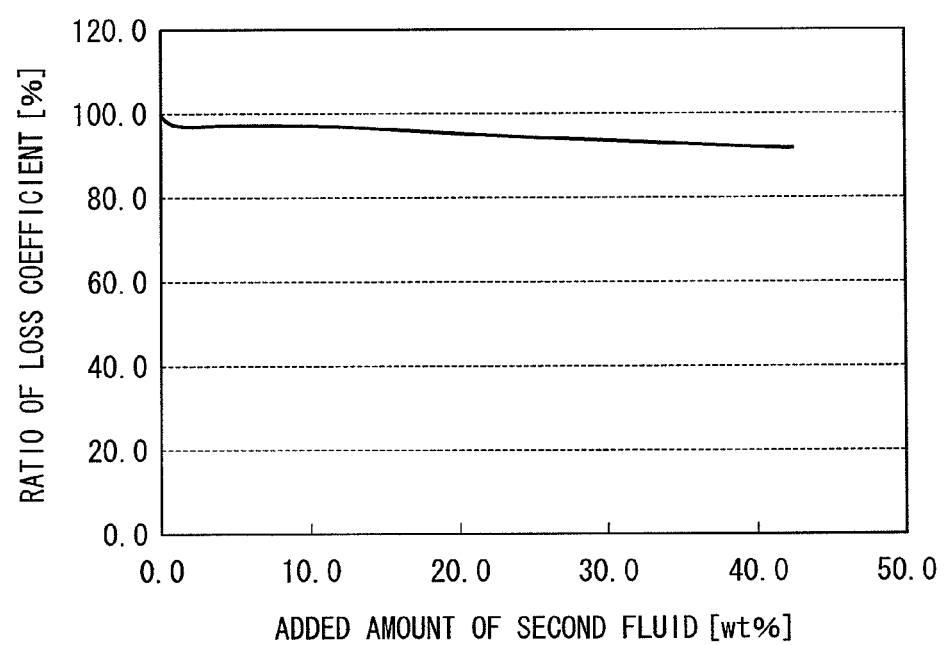
FIG. 9 is a graph showing a relationship of an addition amount of a second liquid to a liquid and a ratio of loss coefficient.

Hereinafter, an embodiment of an anti-vibration apparatus according to the present invention will be described with reference to FIG. 1. The anti-vibration apparatus 10 includes a cylindrical first mounting member 11 connected to one of a vibration generating portion and a vibration receiving portion, a second mounting member 12 connected to the other of the vibration generating portion and the vibration receiving portion, a first rubber elastic body 13 for elastically connecting the first and second mounting members 11 and 12 to each other, and a dividing member 16 for dividing an inner part of the first mounting member 11 into a primary liquid chamber 14 and a secondary liquid chamber 15 described below.

In addition, each of the members is formed to make a circular shape or a ring shape when seen from an upper surface thereof and is concentrically arranged on a common axis. Hereinafter, the common axis is called a central axis O.

Furthermore, when the anti-vibration apparatus 10 is mounted on a vehicle, for example, the second mounting member 12 is connected to an engine as the vibration generating portion, and on the other hand, the first mounting member 11 is connected to a car body as the vibration receiving portion via a bracket (not shown) or the like, whereby the transfer of the vibration of the engine to the car body can be suppressed.

The second mounting member 12 is formed in a column shape and is disposed in one end aperture area in a direction of the central axis O of the first mounting member 11. The first rubber elastic body 13 is bonded to the one end opening portion of the first mounting member 11 and an outer peripheral surface of the second mounting member 12 to occlude the first mounting member 11 from the one end in the direction of the central axis O. Furthermore, a female screw portion is formed on the one end surface of the second mounting member 12. In addition, one end portion of the second mounting member 12 in the axial direction protrudes from one end aperture plane of the first mounting member 11 in the direction of the central axis O to the outer side in the direction of the central axis O.

In addition, a diaphragm 19 is disposed on another end aperture area of the first mounting member 11 in the direction of the central axis O. The diaphragm 19 is formed to make a circular shape when seen from the upper surface thereof and forms a reversed bowl shape which is recessed toward another end of the direction of the central axis O. Furthermore, on an outer peripheral portion of the diaphragm 19, an inner peripheral surface of a ring plate 19a is bonded by cure adhesion over the overall periphery thereof. The ring plate 19a is fitted into the another end aperture area of the first mounting member 11, whereby the diaphragm 19 occludes the first mounting member 11 from another end in the direction of the central axis O.

In the above-mentioned structure, among the inner part of the first mounting member 11, a portion situated between the diaphragm 19 and the first rubber elastic body 13 is occluded tightly sealed by the diaphragm 19 and the first rubber elastic body 13 and becomes a liquid chamber filled with a liquid L described later. The liquid chamber is divided into a primary liquid chamber 14 and a secondary liquid chamber 15 by a dividing member 16. The primary liquid chamber 14 has the first rubber elastic body 13 in part of a partition wall and the inner volume thereof is changed due to the deformation of the first rubber elastic body 13. The secondary liquid chamber 15 has the diaphragm 19 in part of the partition wall and the inner volume thereof is changed due to the deformation of the diaphragm 19.

Herein, an orifice passage 24 is formed which extends along the circumferential direction of the first mounting member 11 between the outer peripheral surface of the dividing member 16 and the inner peripheral surface of the first mounting member 11.

In the shown example, the dividing member 16 is formed in annular shape, a peripheral groove formed on the outer peripheral surface thereof becomes the orifice passage 24, the orifice passage 24 being occluded by a rubber film 18 coated on the inner peripheral surface of the first mounting member 11 from outside along radial direction. In addition, the rubber film 18 is formed integrally with the first rubber elastic body 13, and the inner peripheral surface of the first mounting member 11 is covered by the first rubber elastic body 13 and the rubber film 18 over the entire area thereof. Furthermore, a disk-shaped rubber member 16a is disposed in the inner side of the dividing member 16 in the diameter direction, and occludes the center portion of the dividing member 16 formed in annular shape in the diameter direction.

In addition, in the present embodiment, the anti-vibration apparatus 10 is a compression type in which the primary liquid chamber 14 is mounted so as to be situated at the upper side along the vertical direction and the secondary liquid chamber 15 is mounted so as to be situated at the lower side along the vertical direction.

Furthermore, in the present embodiment, the liquid L contains the first liquid and the second liquid that are mutually insoluble. The second liquid has a higher vapor pressure and a smaller weight percentage (weight %) contained in the liquid L, as compared to the first liquid. In addition, the second liquid has a smaller latent heat of vaporization than that of the first liquid. Furthermore, the second liquid has a higher vapor pressure and a smaller latent heat of vaporization as compared to the first liquid in the range of temperature of at least −30° C. to 100° C. For example, the vapor pressure of the second liquid is greater than or equal to twice that of the first liquid and the latent heat of vaporization per 1 kg of the first liquid is greater than of equal to twice that of the second liquid.

As the first liquid as described above, for example, a liquid containing ethylene glycol and propylene glycol or ethylene glycol alone or the like may be included, and as the second liquid, for example, silicon oil or fluorine oil or the like may be included. Furthermore, the liquid L contains 60 to 99.9 weight % of the first liquid and 0.1 to 40 weight % of the second liquid. Preferably, the liquid L contains 80 to 99.75 weight % of the first liquid and 0.25 to 20 weight % of the second liquid. In addition, the second liquid has a lower viscosity than the first liquid. Furthermore, for example, in the liquid L, the first liquid is included at 80 cc to 200 cc and the second liquid is included at 0.5 cc to 5 cc.

Furthermore, when a large vibration (load) is input to at least the anti-vibration apparatus 10 due to undulations of the road surface, the liquid L goes into a state that the second liquid is dispersed into a plurality of places in the first liquid in a state in which the second liquid is separated from the first liquid.

As described above, according to the anti-vibration apparatus 10 of the present embodiment, since the liquid L sealed in the primary liquid chamber 14 and the secondary liquid chamber 15 contains the first liquid and the second liquid that are mutually insoluble and have different vapor pressures, the vapor pressure of the overall liquid L becomes higher than that of the first liquid alone or that of the second liquid alone.

Thus, after a large vibration has been input by the undulations of the road surface or the like and the liquid pressure of the primary liquid chamber 14 has risen rapidly, in the process when the vibration is input in the reverse direction, for example, due to the rebound of the first rubber elastic body 13 or the like and the liquid pressure within the primary liquid chamber 14 declines, the liquid pressure, which begins to generate the cavitation in the interface region of the first liquid and the second liquid in the liquid L, increases as compared to a case where the first liquid alone or the second liquid alone is sealed in the primary liquid chamber 14 and the secondary liquid chamber 15.

Herein, since the second liquid has the higher vapor pressure than the first liquid, in the subsequent process when the liquid pressure within the primary liquid chamber 14 continues to decline, the cavitation is preferentially generated in the second liquid side having the high vapor pressure among the first liquid and the second liquid in the interface region, while expanding the bubbles generated by the cavitation, whereby the decline in the liquid pressure can be suppressed.

Thus, it is possible to suppress the occurrence of the cavitation in the first liquid, as the weight percentage of the second liquid is smaller than that of the first liquid in the liquid, it is possible to suppress the occurrence of the bubbles due to the cavitation in the liquid L.

As a result, in the process where the liquid pressure of the primary liquid chamber 14 increases and is returned to the original liquid pressure, it is possible to suppress the occurrence of the shock wave due to the collapse of the bubbles, whereby the level of the generated abnormal noise can be reduced.

Furthermore, since the weight percentage contained in the liquid L of the second liquid, which has the higher vapor pressure than the first liquid and readily generate the cavitation, is smaller than that of the first liquid, the above-mentioned working effect is obtained, and on the other hand, for example, even at the normal time when idle vibration and shake vibration are added, it is possible to prevent difficulties in the exerting of liquid bridge resonance in the orifice passage 24 due to easy occurrence of the cavitation, with the result that the damping performance of the anti-vibration apparatus 10 can be reliably secured.

Furthermore, in the present embodiment, since the second liquid has a smaller latent heat of vaporization than the first liquid, it is possible to reduce energy discharged when the bubbles are collapsed in the process when the liquid pressure of the first liquid chamber 14 rises and is returned to the original liquid pressure, that is, when the phase of the second liquid is changed from the gaseous state to the liquefied state, as compared to energy discharged from when the bubbles are generated in the first liquid and are collapsed. Thus, as described above, the occurrence of the bubbles in the first liquid is suppressed, and in addition, the energy generated in the overall liquid can be reliably suppressed.

Furthermore, for example, since a new mechanism such as a valve mechanism may not be added, complication of the anti-vibration apparatus 10 can be avoided. In addition, the level of the generated abnormal noise can be reduced without short-circuiting the primary liquid chamber and the secondary liquid chamber by opening the valve as in the above-mentioned related art. As a result, the working effect is obtained, while the reducing in the damping performance can be prevented, and thus the damping performance can be stabilized.

In addition, the first liquid contains ethylene glycol alone or ethylene glycol and propylene glycol, the second liquid is silicon oil or fluorine oil, and the liquid L contains 60 to 99.9 weight % of the first liquid and 0.1 to 40 weight % of the second liquid. Thus, the above-mentioned working effect is reliably obtained without reducing the damping performance.

Furthermore, although the silicon oil or the fluorine oil used for the second liquid is expensive compared to the ethylene glycol and the propylene glycol, the second liquid has the weight percentage included in the liquid L smaller than the first liquid. Thus, it is possible to suppress an increase in the costs of the anti-vibration apparatus 10.

In addition, when the weight percentage of the second liquid in the liquid L is less than 0.1 weight %, there is a possibility that control of the abnormal noise is insufficient. On the other hand, when the weight percentage of the second liquid exceeds 40 weight %, the suppression of the abnormal noise is possible, but the damping performance may decline.

Furthermore, since the addition amount of the expensive second liquid increases, it is also disadvantageous in terms of cost.

Furthermore, in the present embodiment, since the liquid L is in a state that the second liquid is dispersed into multiple places in the first liquid in a state in which the second liquid is separated from the first liquid, when a large vibration is input to at least the anti-vibration apparatus 10 due to the undulations of the road surface or the like, the place in which the bubbles are generated in the liquid L within the primary liquid chamber 14 can be dispersed without being concentrated in a particular places.

Thus, the place where the shock wave occurs can be dispersed in the liquid L within the primary liquid chamber 14. As a result, until the shock wave progresses in the liquid L and, for example, spreads to a portion formed of a metallic material in the anti-vibration apparatus 10, the energy can be dampened by being mutually interacting with the shock waves.

As a result, even when the shock wave spreads to the portion formed of the metallic material in the anti-vibration apparatus 10, the vibration of the portion can be suppressed, which makes it possible to more reliably reduce the level of the generated abnormal noise.

In addition, the technical scope of the present invention is not limited to the above-mentioned embodiment, but various modifications thereof can be added within the scope without departing from the gist of the present invention.

For example, the first liquid and the second liquid are not limited to the above described examples, but if a liquid has a relatively low kinematic viscosity (equal to or less than $1 \times 10^{-4}$ m$^2$/s at 25° C.), a relatively high boiling point (equal to or larger than 80° C.) and a relatively low freezing point (equal to or less than 0° C.), the invention may be suitably modified.

Additionally, although the compression type has been described as the anti-vibration apparatus 10, the present invention can also be applied to a suspension type anti-vibration apparatus in which the primary liquid chamber 14 is mounted so as to be situated at the lower side along the vertical direction and the secondary liquid chamber 15 is mounted so as to be situated at the upper side along the vertical direction.

In addition, the liquid L is not limited to two kinds of liquids but may contain three or more types of liquids.

Furthermore, for example a surfactant such as an emulsifying agent may be mixed in the liquid L. In this case, when by assembling the anti-vibration apparatus 10 in the liquid L, the liquid L is sealed in the primary liquid chamber 14 and the secondary liquid chamber 15 simultaneously with the assembling, the anti-vibration apparatus 10 can be effectively manufactured.

In addition, for example, by covering the portion, which is situated within the primary liquid chamber 14 except the orifice passage 24 on the surface of the dividing member 16, with a rubber film or the like, the occurrence of the abnormal noise may be prevented.

Furthermore, although in the above-mentioned embodiment, materials as the second liquid having the latent heat of vaporization lower than the first liquid have been described, the materials having the latent heat of vaporization equal to or larger than that of the first liquid may be adopted.

Embodiment

Hereinafter, an embodiment will be described, and in the present invention, the reason why the weight percentage of the second liquid in the liquid is set to be 0.1 to 40 weight % will be described.

First of all, the reason why the weight percentage of the second liquid in the liquid is set to be equal to or larger than 0.1 weight % will be described based on FIGS. 2 to 5. FIGS. 2 to 5 show a relationship of the addition amount of the second liquid to the liquid and the vibration acceleration, the horizontal axis of the graph shows the addition amount (weight %) of the second liquid and the vertical axis shows the vibration acceleration (m/s$^2$). Furthermore, in the drawings, "Max," "Min" and "Ave" respectively indicate a maximum value, a minimum value and an average value of the data. In addition, ethylene glycol was used as the first liquid and fluorine oil was used as the second liquid in the example of FIG. 2. Ethylene glycol was used as the first liquid and silicon oil was used as the second liquid in the example of FIG. 3. Ethylene glycol and propylene glycol were used as the first liquid and fluorine oil was used as the second liquid in the example of FIG. 4. Ethylene glycol and propylene glycol were used as the first liquid and silicon oil was used as the second liquid in the example of FIG. 5.

In addition, the "vibration acceleration" indicates vibration acceleration generated when the anti-vibration apparatus is excited and is associated with the occurrence of the abnormal noise at the time of excitation. Namely, the larger the vibration acceleration is, the easier it is for the abnormal noise to occur.

As shown in FIGS. 2 to 5, by adding the second liquid to the liquid, the vibration acceleration declines, and in particular, when the weight percentage of the second liquid in the liquid is equal to or larger than 0.25 weight %, the vibration acceleration obviously declines. Thus, in the present invention, the weight percentage of the second liquid in the liquid has been set to be equal to or larger than 0.1 weight %, and preferably, equal to or larger than 0.25 weight %.

Next, the reason why the weight percentage of the second liquid in the liquid has been set to be equal to or less than 40 weight % will be described based on FIGS. 6 to 9. FIGS. 6 to 9 show the relationship of the addition amount of the second liquid to the liquid and a ratio of loss coefficient, the horizontal axis of the graph indicates the addition amount (weight %) of the second liquid and the vertical axis thereof indicates the ratio of loss coefficient (%). Additionally, ethylene glycol was used as the first liquid and the fluorine oil was used as the second liquid in the example of FIG. 6. Ethylene glycol was used as the first liquid and silicon oil was used as the second liquid in the example of FIG. 7. Ethylene glycol and propylene glycol were used as the first liquid and fluorine oil was used as the second liquid in the example of FIG. 8. Ethylene glycol and propylene glycol were used as the first liquid and silicon oil was used as the second liquid in the example of FIG. 9.

In addition, the "ratio of loss coefficient" indicates the damping performance when the anti-vibration apparatus is excited, and the higher the ratio is, the higher the damping performance becomes. In case of the present embodiment, the excitation amount is 10 Hz±1 mm.

As shown in FIGS. 6 to 9, in the range in which the weight percentage of the second liquid in the liquid is up to 40 weight %, a large decline in the ratio of loss coefficient is not observed. In particular, in the range equal to or less than 20 weight percentage, high damping performance is maintained in all the examples. Thus, in the present invention, the weight percentage of the second liquid in the liquid has been set to be equal to or less than 40 weight %, preferably equal to or less than 20 weight %.

In addition, details and properties used in the embodiment are as follows.

Ethylene Glycol
   boiling point (° C.): 197
   vapor pressure (Pa) at 25° C.: 13.40
   latent heat of vaporization (kJ/gmol) at 25° C.: 53.2
Fluorine Oil (Hydro Fluorine Ether (HFE))
   boiling point (° C.): 100
   vapor pressure (Pa) at 25° C.: 6000
   latent heat of vaporization (kJ/kg) at 25° C.: 100
Silicon Oil (Dimethylsiloxane)
   boiling point (° C.): 150
   vapor pressure (Pa) at 25° C.: 691
   latent heat of vaporization (cal/g) at 25° C.: 41

Furthermore, it is needless to say that the liquid used for the liquid related to the present invention is not limited to the above-mentioned embodiment. For example, known oils other than hydro fluorine ether can be used as the fluorine oil and known oils other than dimethylsiloxane can be used as the silicon oil.

INDUSTRIAL APPLICABILITY

According to the anti-vibration apparatus of the present invention, the level of the generated abnormal noise can be reduced without complicating the structure and deteriorating the damping performance.

The invention claimed is:
1. An anti-vibration apparatus comprising:
a cylindrical first mounting member connected to one of a vibration generating portion and a vibration receiving portion;
a second mounting member connected to the other of the vibration generating portion and the vibration receiving portion;
a first rubber elastic body for elastically connecting the first and the second mounting members to each other; and
a dividing member that divides an inner part of the first mounting member into a primary liquid chamber in which a liquid is sealed by making the first rubber elastic body a part of a first partition wall and an inner volume thereof is changed due to the deformation of the first rubber elastic body and a secondary liquid chamber in which a second partition wall is formed in a deformable manner and the liquid is sealed; wherein
between an outer peripheral surface of the dividing member and an inner peripheral surface of the first mounting member, an orifice passage for linking the primary liquid chamber with the secondary liquid chamber is formed and the liquid is sealed in the primary liquid chamber and the secondary liquid chamber,
the liquid contains a first liquid and a second liquid that are mutually insoluble, the second liquid having a higher vapor pressure and a lower weight percentage included in the liquid than those of the first liquid, and the liquid, includes 20 wt % or less of the second liquid such that the second liquid is dispersed into a plurality of places in the first liquid in a state in which the second liquid is separated from the first liquid, when receiving a vibration.
2. The anti-vibration apparatus according to claim 1, wherein
the second liquid has a latent heat of vaporization lower than that of the first liquid.
3. The anti-vibration apparatus according to claim 1, wherein
the first liquid contains ethylene glycol alone or ethylene glycol and propylene glycol and the second liquid contains silicone oil or fluorine oil.

4. The anti-vibration apparatus according to claim 2, wherein
the first liquid contains ethylene glycol alone or ethylene glycol and propylene glycol and the second liquid contains silicone oil or fluorine oil.

5. The anti-vibration apparatus according to claim 1, wherein
the liquid includes 0.5 to 5 $cm^3$ of the second liquid.

6. The anti-vibration apparatus according to claim 1, wherein
a ratio of volume percentage of the second liquid to the first liquid is 0.25 to 6.25%.

7. The anti-vibration apparatus according to claim 1, wherein
the dispersed second liquid limits increases in size of bubbles formed in the first liquid in response to the vibration by generating bubbles earlier in the second liquid than the first liquid in response to the vibration.

8. The anti-vibration apparatus according to claim 1, wherein
a ratio of weight percentage of the second liquid to the first liquid is 25% or less.

* * * * *